United States Patent
Heikkinen et al.

(10) Patent No.: US 6,758,459 B1
(45) Date of Patent: Jul. 6, 2004

(54) WEED PULLER

(76) Inventors: Edward A. Heikkinen, 1217 Columbine Ct., Arlington, TX (US) 76013; Doris A. Heikkinen, 1217 Columbine Ct., Arlington, TX (US) 76013

( * ) Notice: Subject to any disclaimer, the term of this patent is extended or adjusted under 35 U.S.C. 154(b) by 0 days.

(21) Appl. No.: 10/349,895

(22) Filed: Jan. 23, 2003

(51) Int. Cl.$^7$ .................................................. B66F 3/00
(52) U.S. Cl. ...................................................... 254/132
(58) Field of Search ......................... 254/132; 172/378, 172/371, 361; 294/50.5

(56) References Cited

U.S. PATENT DOCUMENTS

| | | | |
|---|---|---|---|
| 1,494,557 A | * | 5/1924 | Lumry et al. ............... 254/132 |
| 3,976,282 A | | 8/1976 | Baker |
| 4,135,700 A | | 1/1979 | Arzoian |
| 4,243,206 A | | 1/1981 | Heikkinen et al. |
| 4,815,778 A | * | 3/1989 | Hoch ......................... 254/132 |
| 4,901,801 A | * | 2/1990 | Popivalo .................... 254/132 |
| 5,383,523 A | | 1/1995 | Stamp |
| 5,477,667 A | | 12/1995 | Bryant |
| 5,868,447 A | * | 2/1999 | Clark et al. .................. 294/55 |

* cited by examiner

*Primary Examiner*—Robert C. Watson
(74) *Attorney, Agent, or Firm*—Geoffrey A. Mantooth; Arthur F. Zobal

(57) ABSTRACT

The weed puller comprises foot block molded out of plastic material with tines molded into a forward end and with an aperture formed in its upper surface for receiving a handle. In the embodiment disclosed, the foot block comprises two opposite facing sides and six edge surfaces which comprises a front surface, an upper surface, a fulcrum transverse to the upper surface and which comprises a rear surface, a bottom surface, and a forward fulcrum surface. A surface also extends from the forward fulcrum surface to the first end. The tines are molded into the block and extend out of the front surface.

4 Claims, 10 Drawing Sheets

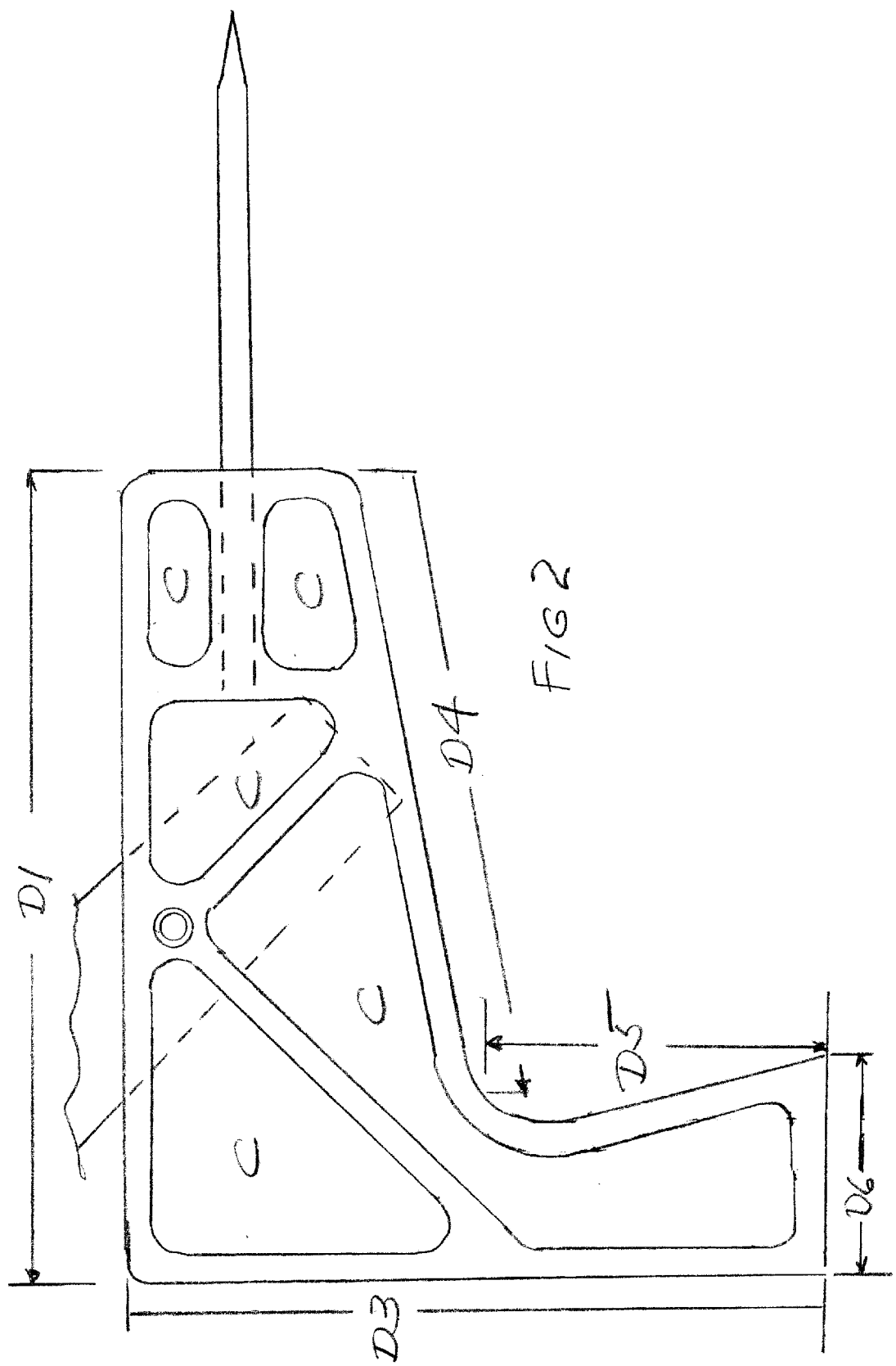

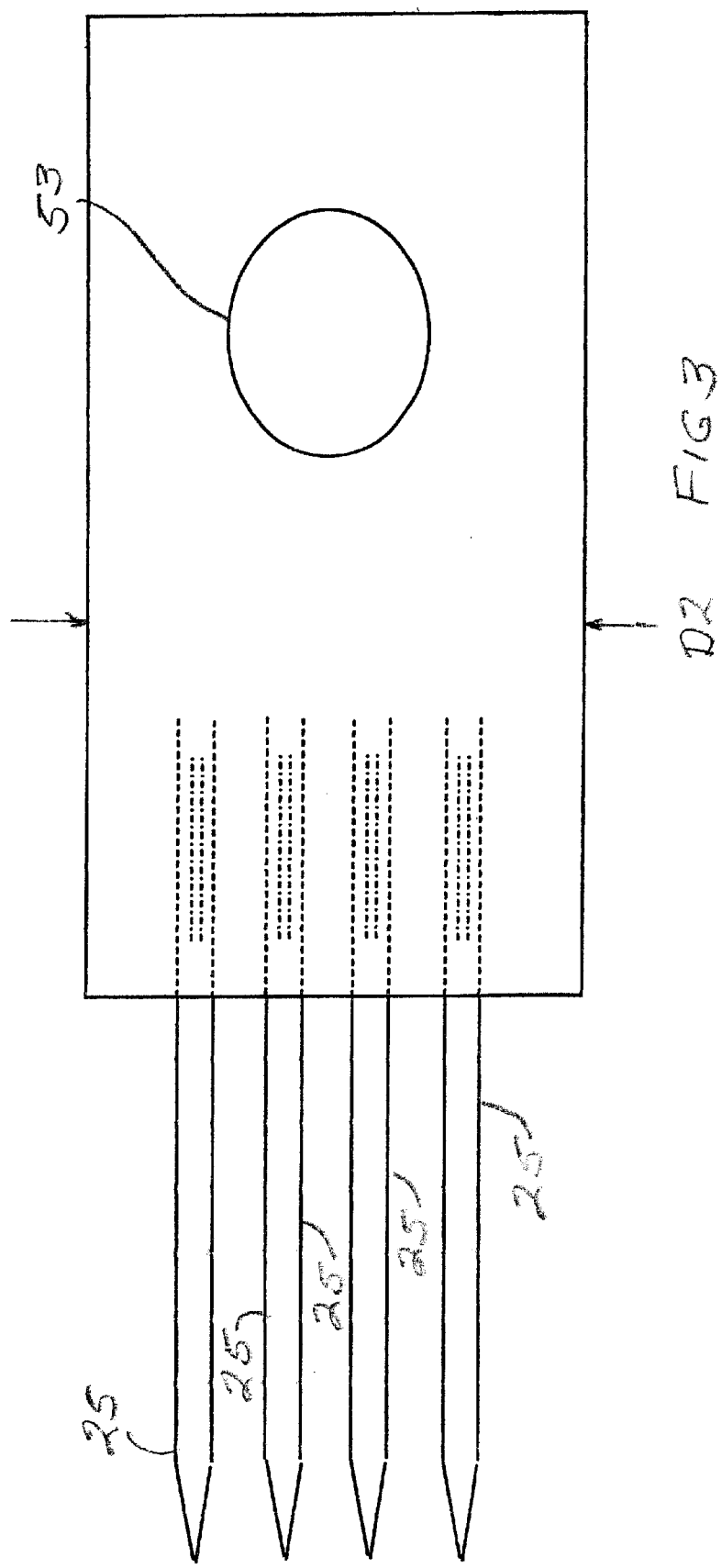

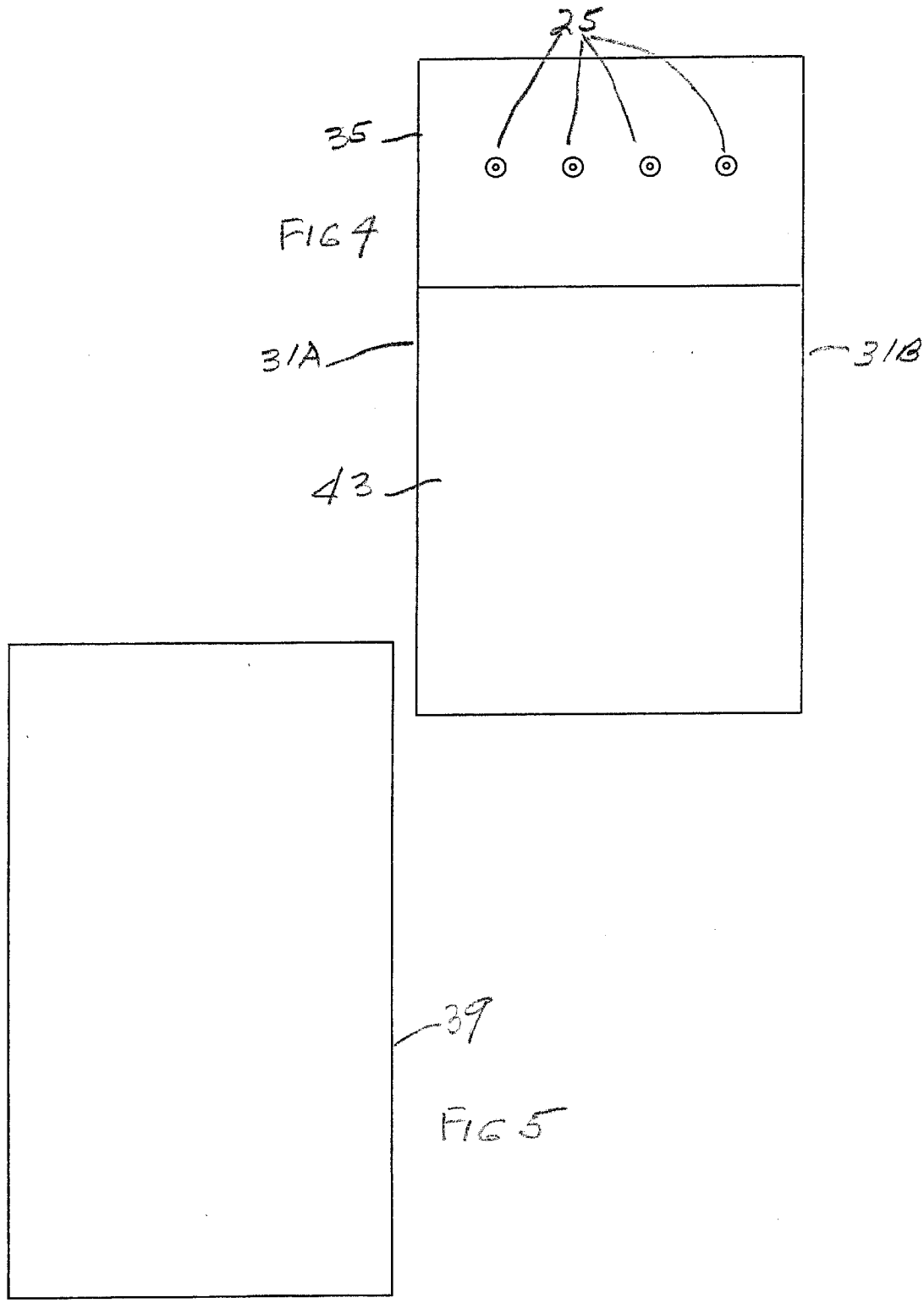

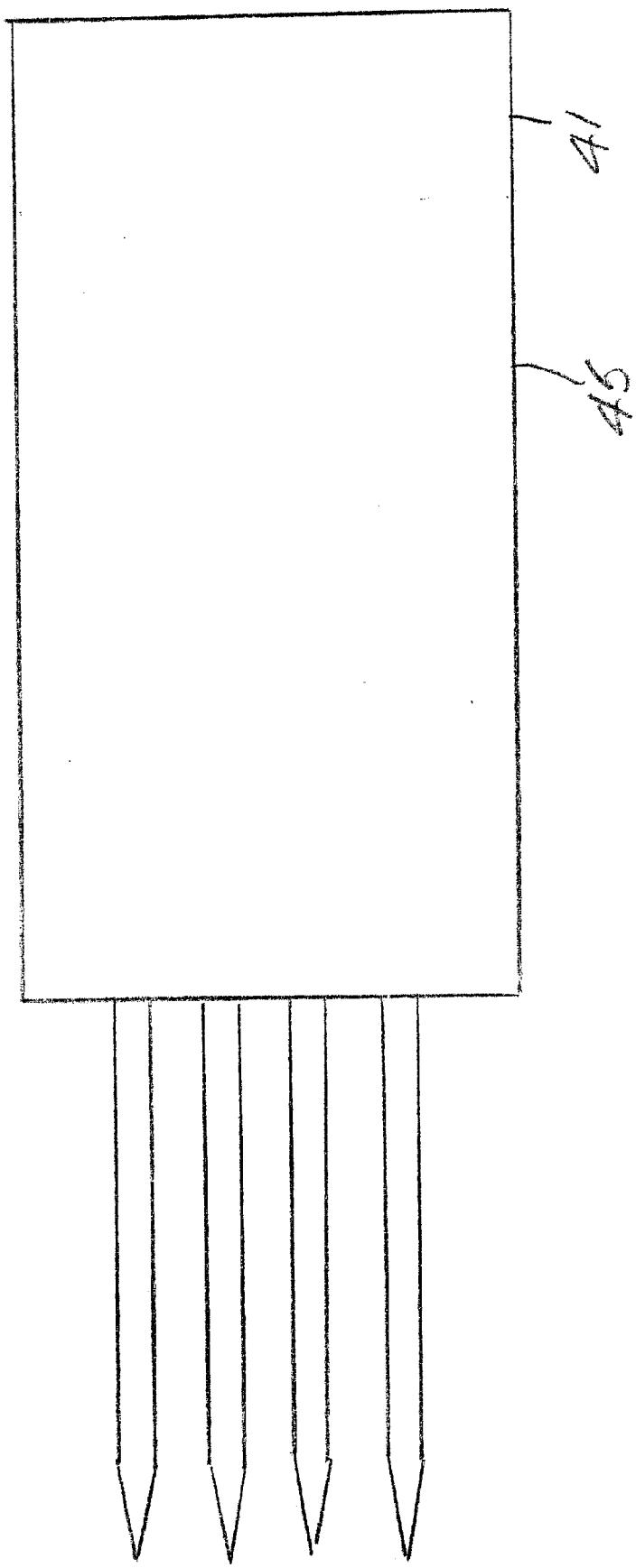

WEED PULLER

BACKGROUND OF THE INVENTION

1. Field of the Invention

The invention relates to a simple and inexpensive Weed Puller that requires no moving parts.

2. Description of the Prior Art

U.S. Pat. Nos. 3,976,282; 4,135,700; 4,243,206; 5,383,523; and 5,477,667 disclose weed pullers that are difficult or expensive to produce or require moving parts.

SUMMARY OF THE INVENTION

It is an object of the invention to provide a simple and inexpensive weed puller that requires no moving parts.

The weed puller comprises foot block molded out of plastic material with tines molded into a forward end and with an aperture formed in its upper surface for receiving a handle.

In the embodiment disclosed, the foot block comprises two opposite facing sides and six edge surfaces which comprises a front surface, an upper surface, a fulcrum transverse to the upper surface and which comprises a rear surface, a bottom surface, and a forward fulcrum surface. A surface also extends from the forward fulcrum surface to the first end. The tines are molded into the block and extend out of the front surface.

BRIEF DESCRIPTION OF THE DRAWINGS

FIG. 2 is a side view opposite that of FIG. 1.

FIG. 3 is a top view of the weed puller.

FIG. 4 is a front view of the weed puller.

FIG. 5 is a rear view of the weed puller.

FIG. 6 is a bottom view of the weed puller.

FIGS. 12, 13, and 14 are different isometric views of the weed puller of FIGS. 10 and 11.

DESCRIPTION OF THE PREFERRED EMBODIMENTS

Figure 1:
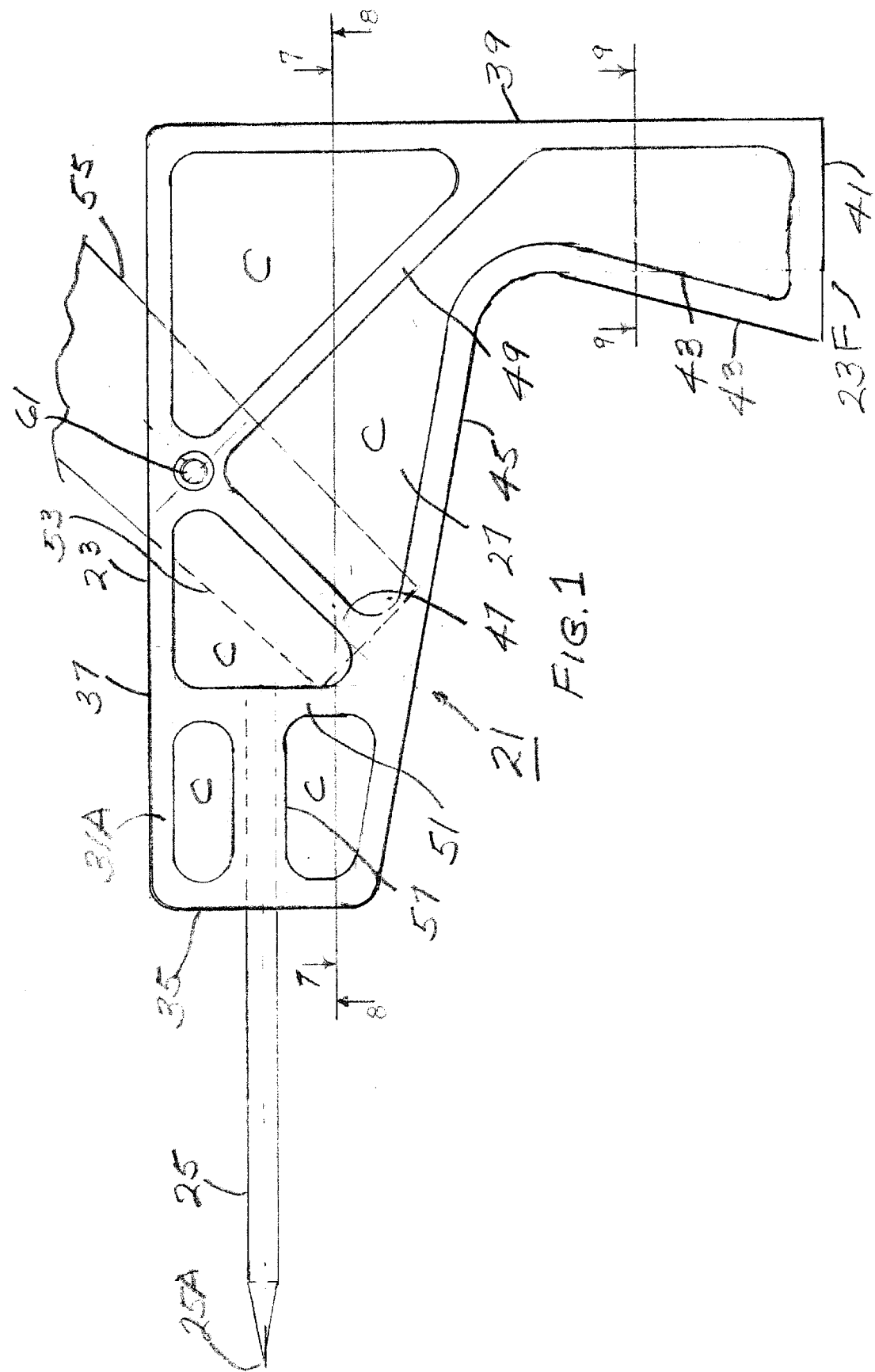
FIG. 1 is a side view of the weed puller.
Figure 7:
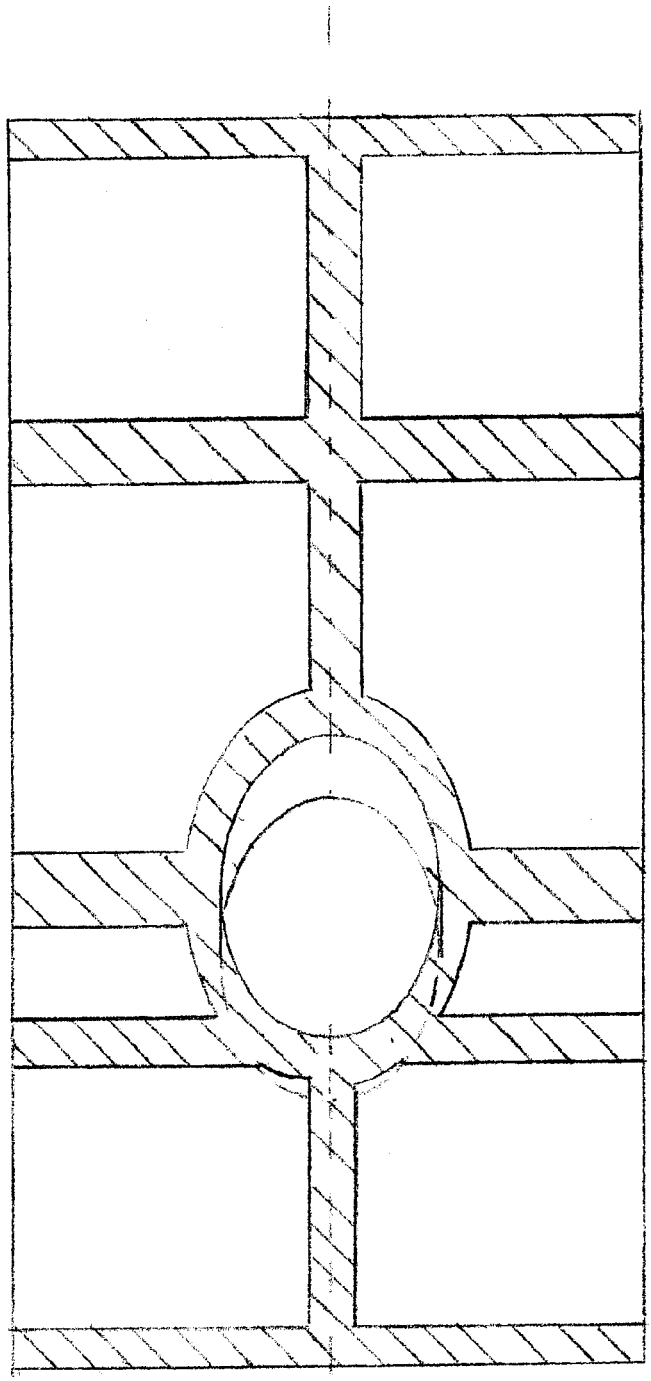
FIG. 7 is a cross-section of FIG. 1 as seen along lines 7—7 thereof.
Figure 8:
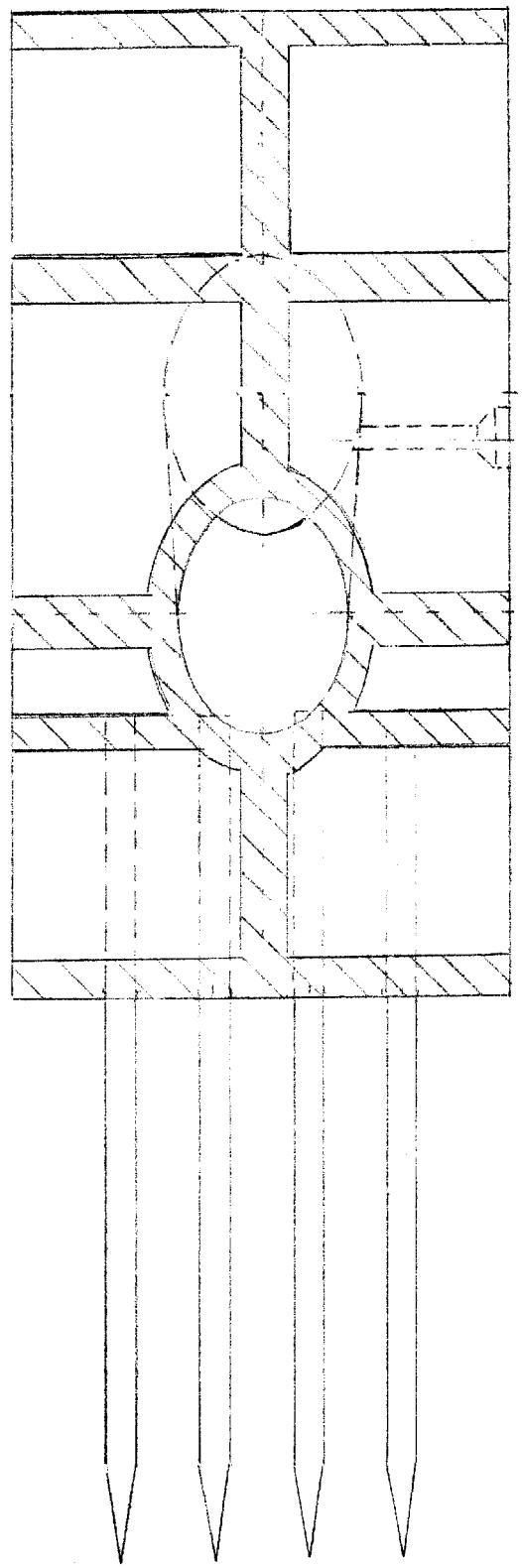
FIG. 8 is a cross-section of FIG. 1 as seen along lines 8—8 thereof.
Figure 9:
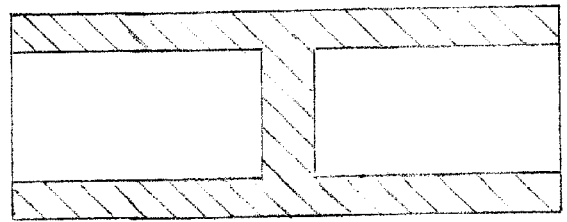
FIG. 9 is a cross-section of FIG. 1 as seen along lines 9—9 thereof.

Referring now to FIGS. 1–9, the weed puller is identified at 21. It comprises a plastic foot block 23 with a row of four metal tines 25, with outer pointed ends 25A. The foot block 23 comprises an inner core 27 portion with ribs extending outward from both sides of the core 27 to define two opposite facing sides 31A and 31B having recesses or cored out portions C formed between the ribs. The ribs 35 and 37 define the front and upper surfaces of the block 23. The ribs 39, 41, and 43 define a fulcrum 23F and the rib 45 extend from the rib 43 to the front end 35. Ribs 35 and 37 are perpendicular to each other as are ribs 37 and 39. In addition, ribs 39 and 41 are perpendicular to each other as are ribs 41 and 43. The rib 45 forms obtuse angles with ribs 43 and 35 respectively. Ribs 47, 49 and 51 are support ribs. An aperture 53 for holding a handle 55 is formed into the core 27 at an angle such that the aperture 53 slants rearward. Ribs 57 extend between ribs 35 and 51 and have the metal tines 25 molded therein. The tines 25 also are molded in ribs 35 and 51. The tines 25 and the aperture 53 define an obtuse angle.

In one embodiment the foot block has dimensions D1 of 5 ¼" long and D2 of 2 ⅝ inches wide. The length of D3 is ½". The rib 45 has a dimension D4 of 4½". The dimensions D5 is 2" and D6 is 1½". The recesses are 1 3/16" deep on both sides of the block except around the circumference of the aperture 53 for the handle 55. The recess around the circumference of the aperture 53 is sufficient to leave enough material around the aperture 53 to support the handle. The apertures 53 is tapered inward from an outer diameter of 1½". The total length of each of the hardened tines 25 is 4 ½" of which 3" extend outside of the tool with 1 ½" being molded into the foot block. The tines are knurled where they are molded into the block, the handle 55 has a tapered end for reception into the apertures 55 and may have a length of 40". A ¼" counter bored hole 61 is provided for a No. 8 wood screw to attach the handle to the bock. It is to be understood that the above dimensions may vary.

Preferably the foot block is molded from a foam filled polypropulene plastic.

The weed puller has no moving parts, is expensive to produce and simple to use with no learning process. For pulling weeds, the following steps are carried out.

While holding the handle 55 straight up, the tines 25 are inserted into the ground or lawn for removing weeds or plants The handle is pulled backward while the fulcrum 23F is engaging the ground to pry the weeds, including the roots out of the ground. The weeds then are removed from the tines. The tool can be flipped and used for light tilling in flower beds and vegetable gardens.

Figure 10:
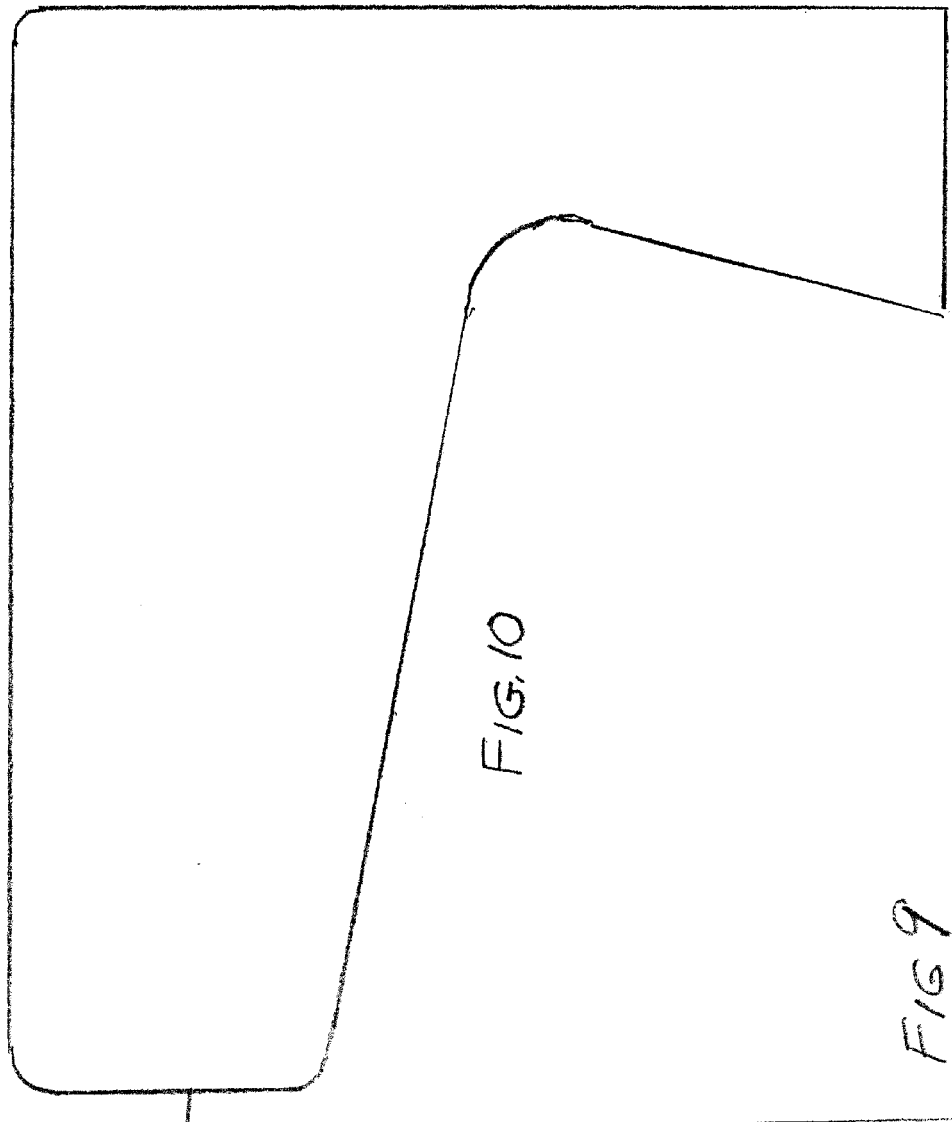
FIG. 10 is a side view of another embodiment of the weed puller with the tines not shown.
Figure 11:
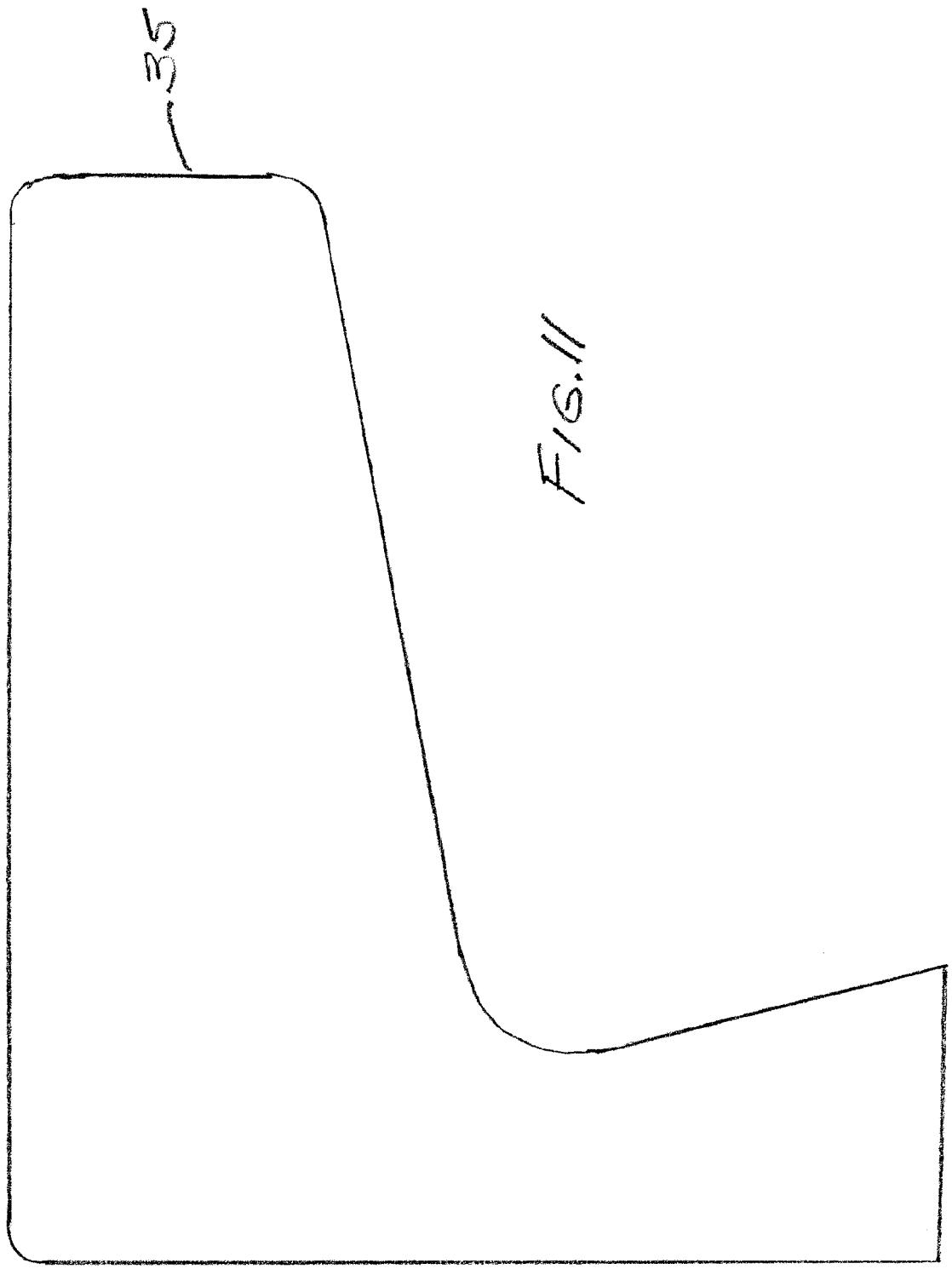
FIG. 11 is a side view of the weed puller of FIG. 10 (with the tines not shown) opposite that of FIG. 7.
Figure 13:
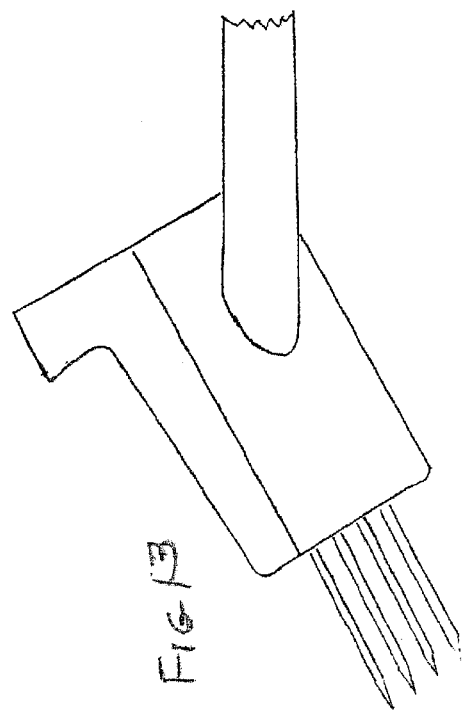
Figure 14:
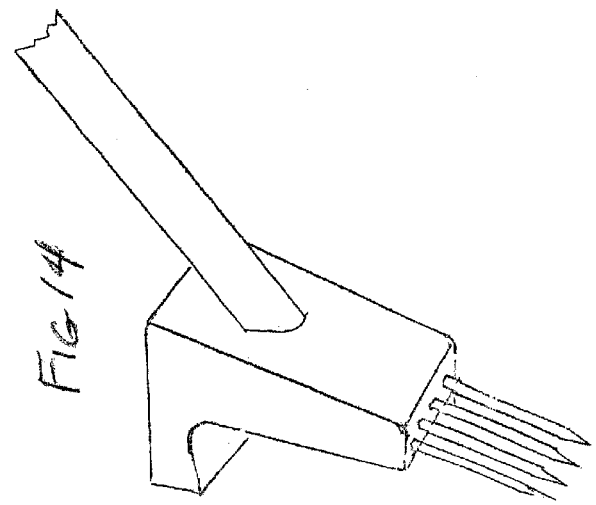
Figure 13:
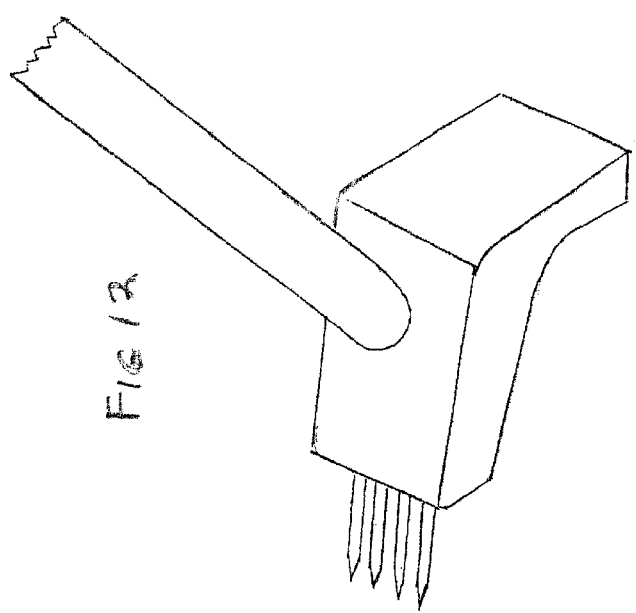

The recesses reduces the weight of the tool and reduces the amount of plastic used. The foot block 23 however can be molded as a solid block of plastic as shown in FIGS. 10–14 with the tines 25 extending out of the front surface 35.

What is claimed is:

1. A weed puller, comprising a body formed from plastic material, a first end and opposite second end, an upper surface extending from said first end to said second end, a fulcrum member at said first end extending transversely from said upper surface for engaging the ground, tines secured to said second end and extending outward for insertion into the ground for use for removing weeds or the like from the ground when said fulcrum engages the ground and said tines are rotated upward from the ground, and said tines being located in a plane between said upper surface and a bottom of said fulcrum member, an aperture formed in said upper surface for receiving a handle, said aperture extending at an angle in a direction such that it forms an acute angle relative to said tines.

2. The weed puller of claim 1, wherein:

said fulcrum comprises, a rear surface extending transversely from said upper surface, a bottom surface extending transversely form said rear surface, and a forward surface extending transversely from said bottom surface, and a surface extending from said forward surface to said second end.

3. The weed puller of claim 2, wherein:

said second end comprises a forward surface.

4. The weed puller of claim 3, wherein all of said surfaces comprises flat surfaces.

* * * * *